(12) United States Patent
Boman et al.

(10) Patent No.: US 6,996,527 B2
(45) Date of Patent: Feb. 7, 2006

(54) LINEAR DISCRIMINANT BASED SOUND CLASS SIMILARITIES WITH UNIT VALUE NORMALIZATION

(75) Inventors: Robert C. Boman, Thousand Oaks, CA (US); Philippe R. Morin, Santa Barbara, CA (US); Ted H. Applebaum, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 838 days.

(21) Appl. No.: 09/915,717

(22) Filed: Jul. 26, 2001

(65) Prior Publication Data

US 2003/0023434 A1    Jan. 30, 2003

(51) Int. Cl.
*G10L 15/08* (2006.01)

(52) U.S. Cl. .............. 704/239; 704/245; 704/241; 704/243; 704/234; 704/254; 340/146.3; 395/2.56

(58) Field of Classification Search .............. 704/254, 704/241, 243, 238, 234, 247, 233, 239, 245; 381/41; 706/25; 395/2.63, 2.47, 2.56; 304/146.3
See application file for complete search history.

(56) References Cited

U.S. PATENT DOCUMENTS

| | | | |
|---|---|---|---|
| 3,755,780 A | * | 8/1973 | Sammon et al. ............ 382/194 |
| 5,131,043 A | | 7/1992 | Fujii et al. |
| 5,309,547 A | | 5/1994 | Niyada et al. |
| 5,345,536 A | | 9/1994 | Hoshimi et al. |
| 5,684,925 A | | 11/1997 | Morin et al. |
| 5,687,287 A | * | 11/1997 | Gandhi et al. .............. 704/247 |
| 5,692,097 A | | 11/1997 | Yamada et al. |
| 5,822,728 A | | 10/1998 | Applebaum et al. |
| 5,826,230 A | * | 10/1998 | Reaves ........................ 704/233 |
| 5,926,804 A | * | 7/1999 | Tufts et al. ................... 706/25 |
| 6,038,535 A | * | 3/2000 | Campbell .................... 704/275 |
| 6,230,129 B1 | * | 5/2001 | Morin et al. ................. 704/254 |

* cited by examiner

*Primary Examiner*—W. R. Young
*Assistant Examiner*—Jakieda Jackson
(74) *Attorney, Agent, or Firm*—Harness, Dickey & Pierce, PLC

(57) ABSTRACT

A common requirement in automatic speech recognition is to recognize a set of words for any speaker without training the system for each new speaker. A speech recognition system is provided utilizing linear discriminant based phonetic similarities with inter-phonetic unit value normalization. Linear discriminant analysis is utilized using training data with both in-class and out-class sample training utterances for generating linear discriminant vectors for each of the phonetic units. The dot product of each linear discriminant vector and the time spectral pattern vectors generated from the input speech are computed. The resultant raw similarity vectors are then normalized utilizing normalization look-up tables for providing similarity vectors which are utilized by a word matcher for word recognition.

11 Claims, 4 Drawing Sheets

LINEAR DISCRIMINANT BASED SOUND CLASS SIMILARITIES WITH UNIT VALUE NORMALIZATION

FIELD OF THE INVENTION

The present invention relates to speech recognition systems, and more particularly, to a speech recognition system utilizing linear discriminant based phonetic similarities with inter-phonetic unit value normalization.

BACKGROUND AND SUMMARY OF THE INVENTION

A common task in automatic speech recognition is to recognize a set of words for any speaker without training the system to each new speaker. This is done by storing the reference word templates in a form that will match a variety of speakers. U.S. Pat. No. 5,822,728 entitled "Multistage Word Recognizer Based On Reliably Detected Phoneme Similarity Regions" and assigned to the Assignee of the present invention, resulted in word templates being composed of phoneme similarities. In that work, the phoneme similarities were computers using Mahalanobis distance which was expanded with an exponential function and normalized globally over the entire phoneme set. The assumption of U.S. Pat. No. 5,822,728 is that if the speech process can be modeled as a Gaussian distribution, then the likelihood of the phoneme being spoken can be computed.

In the Mahalanobis distance algorithm only relative phonetic unit similarities are computed. This means that even in non-speech segments, there will be high similarity values. Because of this, the Mahalanobis algorithm generally needs to be coupled with a speech detection algorithm so that the similarities are only computed on speech segments.

Accordingly, it is desirable in the art of speech recognition to provide an automatic speech recognition system in which an assumption of Gaussian distribution is not required. Also, it is desirable to provide an automatic speech recognition system in which the subword units to be modeled are not required to be phonemes, but can be of any sound class such as monophones, diphones, vowel groups, consonant groups, or statistically clustered units.

The present invention utilizes a linear discriminant vector which is computed independently for each sound class. At recognition time, a time spectral pattern for the current time interval, and those in the immediate temporal neighborhood are collected together and considered as one large parameter vector. The dot product (also called "inner product") of this vector and each discriminant vector is computed. The products are then provided as a measure of the confidence that the sound class is present. Since the discriminant vectors are computed separately, a numeric value for one sound class might not have the same meaning as for another sound class. To normalize the values between sound classes, a normalization function is used. According to an embodiment of the present invention, a look-up table is utilized for the normalization function. The look-up table can be computed from histograms of training utterances. The normalization function is computed such that a large negative value (minus A) indicates high confidence that the utterance does not contain the sound class while a large positive value (plus A) indicates high confidence that the utterance does contain the sound class while a "0" indicates no confidence either way.

The normalized similarity values for all sound classes are collected to form a normalized similarity vector.

The normalized similarity vector is then used by a word matcher for comparison with prestored reference vectors in order to determine the words of the input speech utterance.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
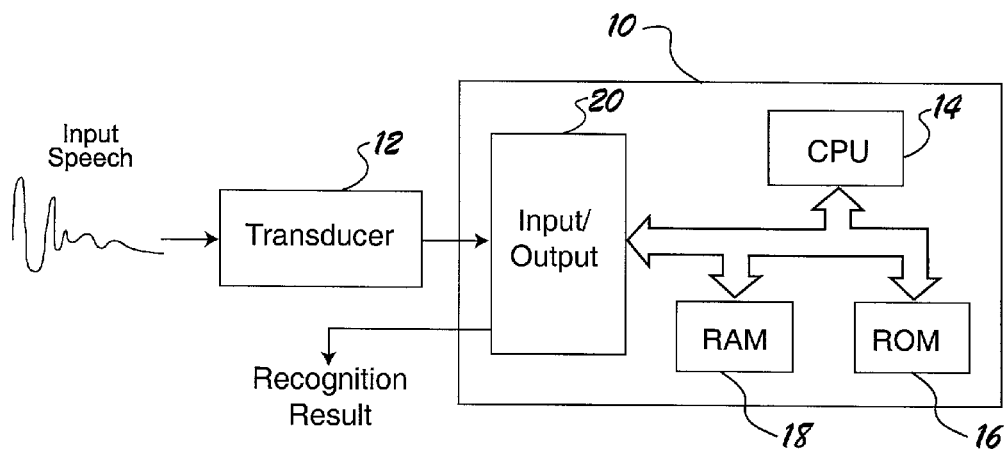
FIG. 1 is a block diagram of a speech recognition system which executes the speech recognition method according to the principles of the present invention.
Figure 2:
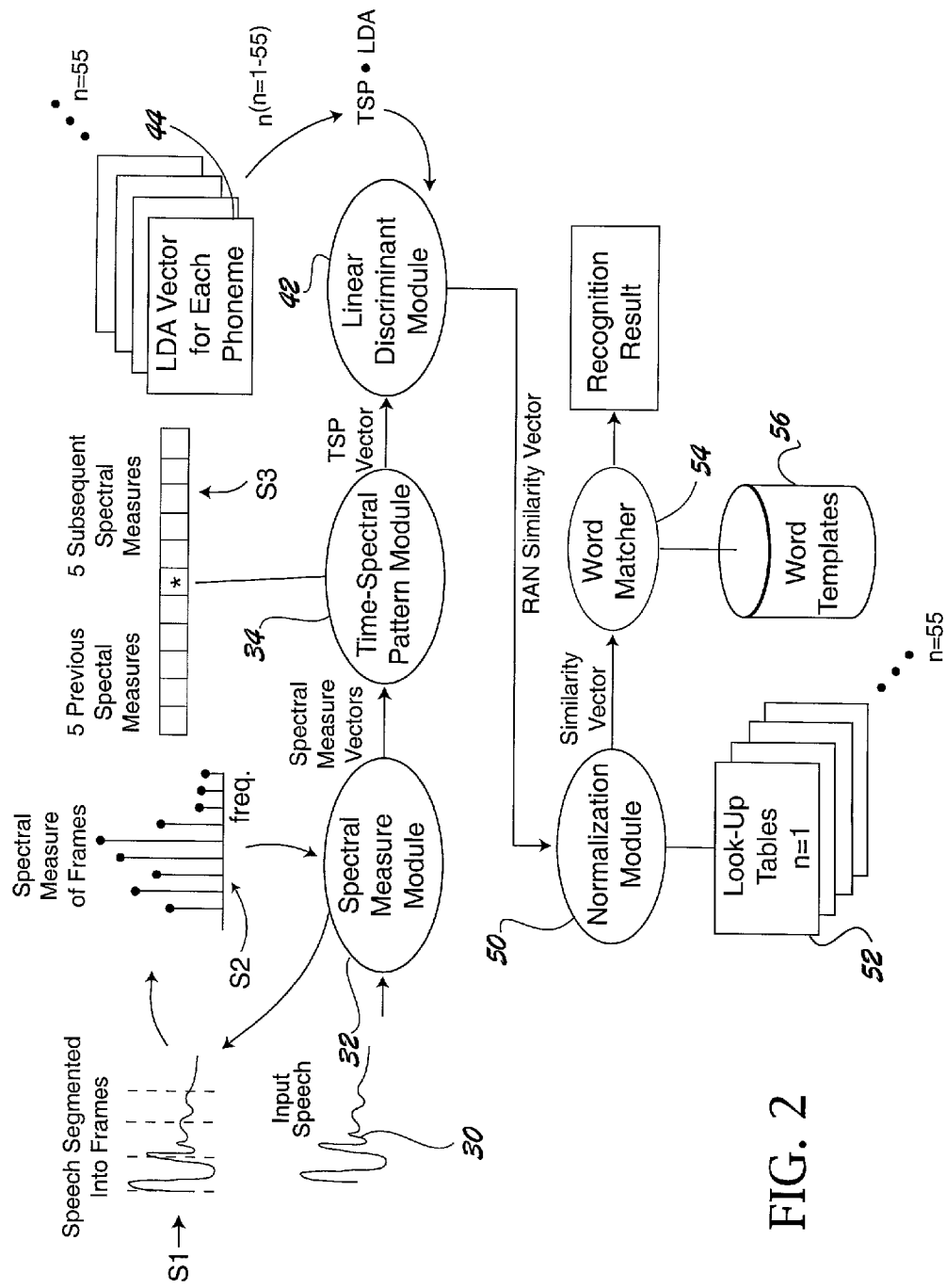
FIG. 2 is a dataflow diagram of the speech recognition method of the present invention utilizing linear discriminant based phonetic similarities with inter-phonetic unit value normalization.

With reference to FIGS. 1 and 2, the speech recognition system utilizing linear discriminant based phonetic similarities with inter-sound class unit value normalization will now be described. As shown in FIG. 1, the speech recognition system is employed with a computer system 10 and includes a transducer 12 for receiving the input speech. The computer system 10 includes a micro-computer, a digital signal processor, or a similar device which has a combination of a CPU 14, a ROM 16, a RAM 18, and an input/output section 20.

Speech generated by a speaker is converted by the transducer 12 into a corresponding electric speech signal. The speech signal is inputted into the computer system 10, being subjected to a speech recognition process by the computer system 10. The computer system 10 outputs a signal representing the result of the recognition of the input speech. Specifically, the speech signal is transmitted from the transducer 12 to the input/output section 20 of the computer system 10. The input/output section 20 includes an analog-to-digital converter which digitizes the speech signal. The resultant digital speech signal is processed according to the process illustrated in FIG. 2 according to the principles of the present invention.

Referring to FIG. 2, the method of speech recognition utilizing linear discriminant based phonetic similarities with inter-sound class unit value normalization is illustrated. Initially, an input speech, generally represented by reference numeral 30, is received by a spectral measure module 32 which segments the speech utterance signal into possibly overlapping consecutive time segments, called frames (step S1). Preferably, the time step between consecutive frames is approximately ten milliseconds (10 ms), although different time steps may be utilized.

The spectral measure module 32 then computes a spectral measure for each frame (step S2). The spectral measure is a measure of the distribution of energy in the frame. In the preferred embodiment, the energy distribution represents the logarithm of the energy in each of several frequency bands. Before taking the logarithm, the energy is dynamically floored to avoid taking the logarithm of zero and to mask noise. The number of frequency bands can vary. An alternative representation is to use cepstrums which are a linear remap of log-spectrums. The spectral measure is computed for each frame. For purposes of this example, fifteen spectral bands are utilized for the spectral measure. This provides fifteen coefficients that define a spectral measure vector. The spectral measure vector for each time frame is provided to a time-spectral pattern module 34 which strings together several successive spectral measure vectors to form one large time spectral pattern (TSP) vector (step S3). According to a preferred embodiment, approximately five previous and five subsequent spectral measure vectors are strung together with each spectral measure vector to form a time spectral pattern vector. The TSP vector includes the fifteen coefficients of each spectral measure frame for each of the eleven successive frames thereby providing an 11×15 matrix.

The time spectral pattern vector is then provided to a linear discriminant module 42. The linear discriminant module 42 includes a linear discriminant vector $44_N$ for each phoneme or other sound classification. For purposes of the present example, the use of phonemes as a sound classification will be utilized, although it should be understood that other sound classifications can be utilized such as monophones, diphones, syllables, vowel groups, consonant groups, or statistically clustered units. There are typically fifty-five (55) recognized phonemes. As is generally recognized in the art, a phoneme is a basic unit of sound which is utilized to form syllables which are utilized to form words. The linear discriminant vectors that are generated for each phoneme are stored in ROM 16 for utilization by linear discriminant module 42.

Each of the linear discriminant vectors is calculated according to Fisher's linear discriminant analysis utilizing two classes of training data. The training data includes recorded speech utterances from various speakers. The training data is classified into one of two classes called "in-class" and "out-class." The "in-class" data is the set of training time spectral patterns that contain the desired phonetic unit, and the "out-class" data is the rest of the training data that does not contain the desired phonetic unit. The time spectral pattern (i.e., the 11×15 matrix of coefficients) for these in-class and out-class training data are then utilized with Fisher's linear discriminant analysis technique to calculate the linear discriminant vectors $44_N$ for each of the fifty-five recognized phonemes. Fisher's linear discriminant can be characterized by the following:

Let Ni be the number of in-class training samples.
Let No be the number of out-class training samples.
Let Xii be the ith in-class training sample (a vector).
Let Xoi be the ith out-class training sample (a vector).
Let Ui be the mean of the in-class training samples (a vector).
Let Uo be the mean of the out-class training samples (a vector).
Let Utotal be the mean of all training samples (a vector).
Let Sw be with within-class scatter matrix (a matrix).
Let Sb be the between class scatter matrix (a matrix).
Let d be the discriminant (a vector).

$$S_w = \frac{1}{N_i}\sum_{i=1}^{N_i}(x_{ii}-\mu_i)(x_{ii}-\mu_i)^T + \frac{1}{N_o}\sum_{i=1}^{N_o}(x_{oi}-\mu_o)(x_{oi}-\mu_o)^T$$

$$S_b = (u_i - u_{total})(u_o - u_{total})^T$$

The discriminant vector d is the eigenvector corresponding to the largest eigenvalue λ in the following equation. This type of equation is known as a generalized eigenvalue equation.

$$S_b d = \lambda S_w d$$

Note that the 1/Ni and 1/No terms in the equation for Sw do not appear in most definitions of Fisher's Linear discriminant. These terms are used in the invention to compensate for the fact that No is generally much larger than Ni.

The linear discriminant module 42 computes the dot product of the linear discriminant vector $44_N$ for each phoneme and the TSP vector in order to provide a raw similarity score for each phoneme. Thus, a set of raw similarity values is generated which includes the raw similarity score for each of the fifty-five phonemes.

Each raw similarity value is then provided to a normalization module 50. The normalization module 50 accesses look-up tables 52 for each of the raw similarity vector values and constructs a normalized similarity vector which includes a normalized similarity score for each of the phonemes. According to a preferred embodiment of the present invention, the normalized values are between +1 and −1. It should be understood that other normalization ranges may be utilized such as +100 and −100.

Fisher's linear discriminant is only constrained to produce different values for in-class and out-class samples. There is no constraint that in-class samples produce greater values. Since the lookup table requires in-class samples to have higher similarity scores than out-class samples, the dot product result is divided by the mean of the raw dot product values for the in-class training samples.

Each look-up table is initially computed by generating histograms of the number of occurrences of a specific score for in-class and out-class training samples that are calculated by computing the dot product with the linear discriminant vector. These two histograms (one for in-class and one for out-class training data) are normalized by their areas and integrated so they become cumulative distribution functions. This is repeated for each phonetic unit. With the cumulative distribution functions computed, the look-up table for a value X is just the probability that an in-class sample would produce a value less than X minus the probability that an out-class sample would produce a value greater than X. This produces a value that is always between +1 and −1, where −1 means that the sample is not likely the desired phonetic unit, and +1 means that the sample likely is the desired phonetic unit.

Figure 3:
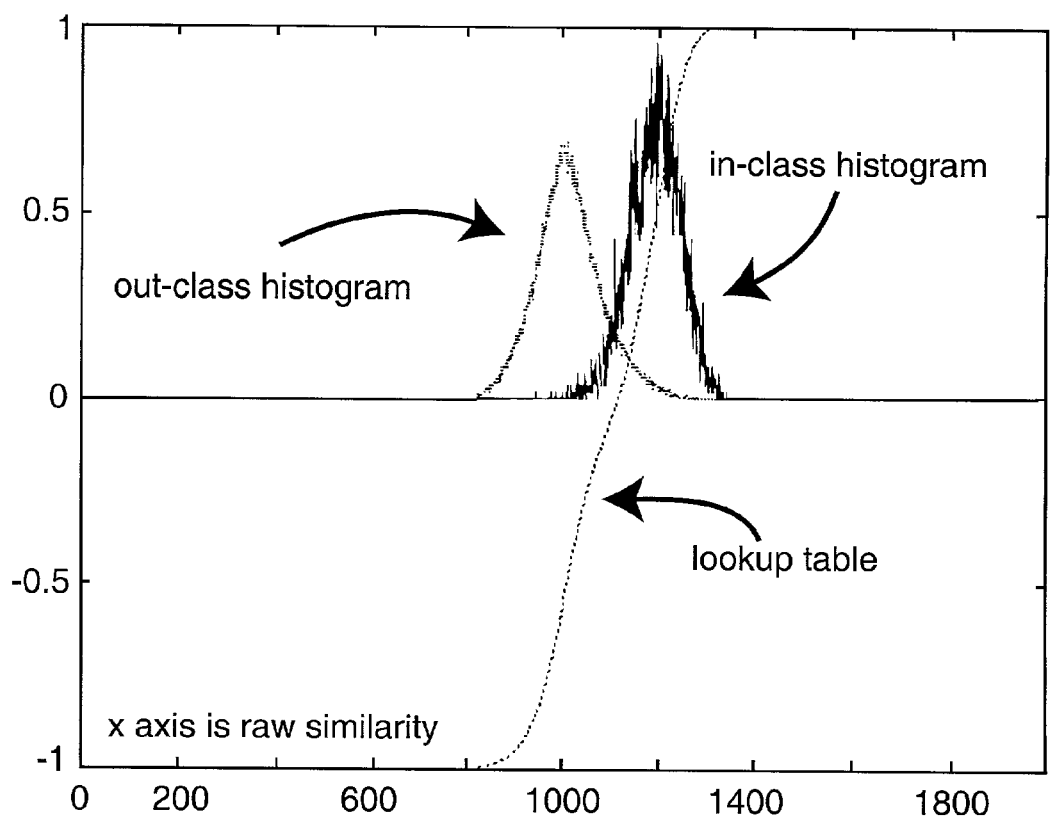
FIG. 3 graphically shows the in-class and out class histograms for an example sound class that are utilized to determine the look-up table curve.

With reference to FIG. 3, an example of a normalized curve of a look-up table is illustrated extending between plus and minus one on the vertical axis. Along the horizontal axis is the raw similarity score which is calculated by computing the dot product of the time spectral pattern TSP vector with the linear discriminant vector for the individual phoneme in question. For exemplary purposes, a raw similarity score of 1200 for the sample look-up table data that is illustrated in FIG. 3 would produce a normalized similarity value of approximately 0.5. The normalization look-up tables are utilized for each phoneme raw similarity score of the raw similarity vector, thus producing a similarity vector which contains the fifty-five normalized similarity values generated from each of the fifty-five look-up tables.

Figure 4:
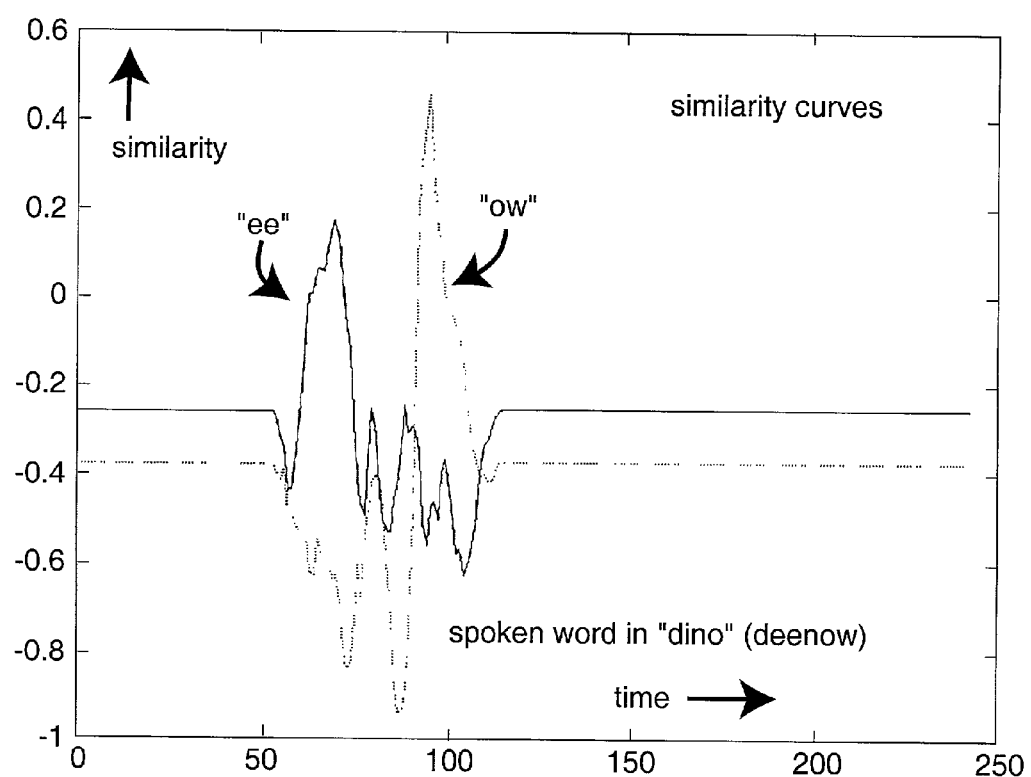
FIG. 4 shows the similarity curves over time for the sound classes "ee" and "ow," for the example spoken word "dino."

FIG. 4 illustrates the similarity curves, over time, for the 5 phonemes "ee" and "ow" for the example spoken word "dino." The solid line is representative of the similarity curve for the phoneme "ee" and the dashed line is representative of the similarity curve for the phoneme "ow." It can be seen that both similarity curves spike downward initially which is during the "d" phoneme, while during the "ee" phoneme, the "ee" similarity curve spikes upward. During the "n" phoneme, both curves are again downward, while during the "ow" phoneme the "ow" similarity curve spikes upward while the "ee" similarity curve is still down.

The normalized similarity vector is then provided to a word matcher that performs frame-by-frame alignment to select the recognized word from a stored word template database 56 having prestored reference vectors. The word matcher 54 utilizes the values between +1 and −1 to determine the most likely phonetic unit and provides a recognition result, e.g., state 1 of stage 2 of the multistage word recognizer in U.S. Pat. No. 5,822,728.

As described above, the method of the present invention utilizes a linear discriminant analysis technique. The discriminant functions have advantages over Gaussian modeling as they directly address discrimination between phonemes, which is desired for speech recognition. The parameters required for computing the similarity value for a particular subword unit consist of the re-normalized linear discriminant vector. These parameters are referred to as phonetic similarity models. A separate phonetic similarity model is computed for each phonetic unit. A look-up table is utilized such that a large negative value (−A) indicates high confidence that the utterance does not contain the corresponding subword unit or phoneme, while a large positive value (+A) indicates a high confidence that the utterance does contain the subword unit or phoneme while a "0" indicates no confidence either way.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A speech recognition processor for processing an input speech utterance in a speech recognition system, comprising:
    a spectral measure module receptive of the input speech utterance for computing spectral measures of the input speech utterance for predetermined time frames;
    a time spectral pattern stage for concatenating a plurality of successive spectral measures for generating a spectral pattern vector;
    a linear discriminant module for computing an initial raw similarity value for each of a plurality of sound classes by computing the dot product of a linear discriminant vector with the time spectral pattern vector;
    a normalization module which accesses normalized values computed based upon training utterances, said normalization module finding corresponding normalized values for each said initial raw similarity value to provide a normalized similarity value and concatenating normalized similarity values to form a similarity vector, said initial raw similarity value concatenating the initial raw similarity values to form a similarity vector; and
    a word matcher module for comparing said similarity vector with pre-stored reference vectors.

2. The speech recognition process according to claim 1, wherein said linear discriminant vector is computed based upon training utterances using Fisher's linear discriminant analysis.

3. The speech recognition processor according to claim 1, wherein said normalized values are computed by taking in-class and out-class training utterances as time spectral patterns and computing the dot product of the time spectral patterns for the training utterances with said linear discriminant vector for generating histograms of the number of occurrences of a specific score for said in-class and out-class training utterances and subtracting normalized scores for the out-class training utterances from normalized scores for the in-class utterances to generate a normalization function.

4. The speech recognition processor according to claim 3, wherein said normalization function includes normalization values between +Σ and −Σ.

5. A method for processing an input speech utterances for speech recognition, comprising:
    representing the input speech utterance as a spectral measure for predetermined time frames;
    generating a time-spectral pattern vector by concatenating together a plurality of spectral measures;
    computing the dot product of said time-spectral pattern vector with a linear discriminant vector to produce an initial similarity value;
    normalizing said preliminary similarity value by applying the normalization function generated based upon training utterances to the initial similarity value to create a normalized similarity value and concatenating normalized similarity values from multiple discriminate vectors associated with multiple sound classes to form a normalized similarity vector; and
    performing a word match with a list of word candidates based upon said normalized similarity vector.

6. The processor of claim 1, wherein linear discriminant vectors are computed individually for each of a plurality of sound classes.

7. The processor of claim 6, wherein said sound classes include two or more of: (a) phonemes; (b) monophones; (c) diphones; (d) vowel groups; and (e) consonant groups.

8. The processor of claim 6, wherein said sound classes include two or more classes of statistically clustered units.

9. The method of claim 5, wherein linear discriminant vectors are computed individually for each of a plurality of sound classes.

10. The method of claim 9, wherein said sound classes include two or more of: (a) phonemes; (b) monophones; (c) diphones; (d) vowel groups; and (e) consonant groups.

11. The method of claim 9, wherein said sound classes include two or more classes of statistically clustered units.

* * * * *